Nov. 17, 1942.    G. GIBERTI    2,301,944
PISTON
Filed May 2, 1939
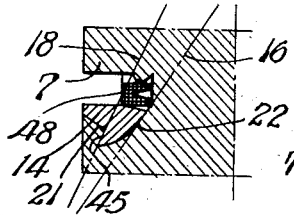
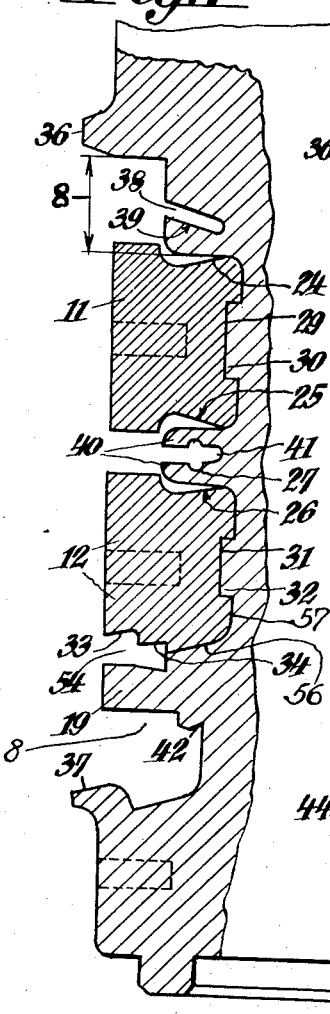
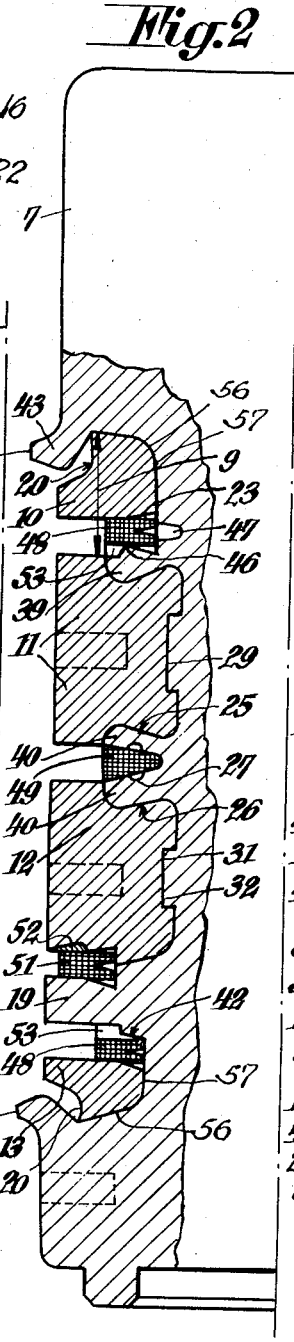
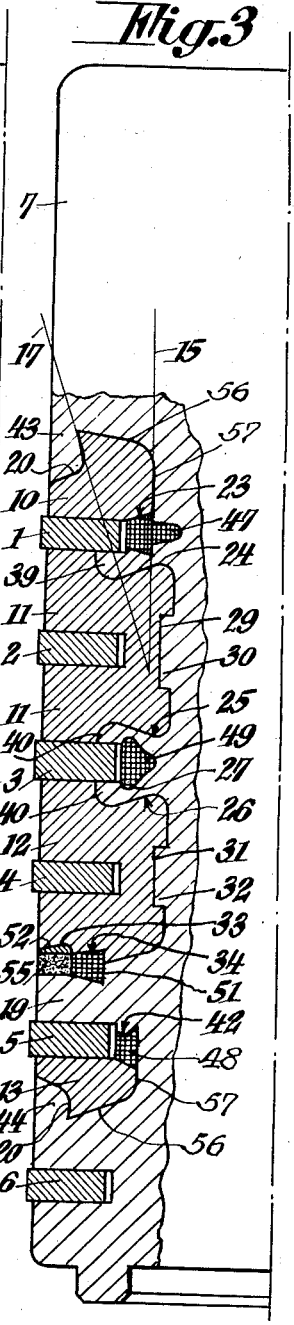
INVENTOR
GUSTAVO GIBERTI
BY H. C. Heide
ATTORNEY Patented Nov. 17, 1942

2,301,944

UNITED STATES PATENT OFFICE 2,301,944

PISTON

Gustavo Giberti, Trieste, Italy; vested in the Alien Property Custodian

Application May 2, 1939, Serial No. 271,273
In Italy May 14, 1938

4 Claims. (Cl. 309—14)

This invention relates to a piston more especially for internal combustion engines and steam engines, whose piston ring grooves are bounded by lining rings which are anchored in the piston body in the direction of the piston axis, by ribs which are of serrated shape in cross section.

According to the present invention, the said pistons for internal combustion engines and steam engines are improved in that the lining rings are provided on the back with one or more plane or curved surfaces which are inclined outwardly to the axis of the piston, and are directed downwardly in connection with the lower lining ring and upwardly in connection with the upper lining ring, the said lining rings being secured in a groove or recess of the piston body.

The drawing shows by way of example how the lining rings for lining the piston ring grooves are adapted to be anchored in the piston body in the manner according to the present invention.

Figures 1 to 3 show in axial section a steel piston body with lining rings inserted in three successive working sections.

Figure 4 shows the method of anchoring a lining ring for the lower side of the piston ring groove of a cast iron piston body.

The lining rings 10 to 14, which are turned from the hardest material which is still capable of being machined, are divided into two or more segments in order to be insertable.

The uppermost and lowest lining rings 10, 13 (Figs. 1–3) bounding the corresponding piston ring grooves on one side are turned on the inner and outer peripheries for producing conical surfaces 15, 17 (Figs. 1–3) or 16, 18 (Fig. 4) so as to allow the lining rings to be anchored in the piston body 7. Their back is provided with one or more plane or curved surfaces 56, 57 which are inclined outwardly to the axis of the piston and are directed downwardly in connection with the lower lining ring 13 and upwardly in connection with the upper lining ring, the said lining rings being secured in the grooves or recesses of the piston body 7.

The lining rings 11 and 12 (Figs. 1–3) for receiving the piston ring 3 are provided on their surfaces facing one another with recesses 25, 26 in which the peripheral ribs 40 of the piston body, which are separated by a narrow peripheral gap 41, are engaged after the ribs are spread apart by caulking an inserted metallic section band. The lining rings 11, 12 are secured against axial displacement in the piston body 7 by means of peripheral ribs 29, 31 which engage in peripheral grooves 30, 32 of the said lining rings. The lower face of the lining ring 12 and the adjacent peripheral rib 19 of the piston body 7 are provided with grooves 33, 34 in which a caulked metallic section band 51 inserted in the peripheral gap 54 engages, said band 51 being anchored by a welding bead 55 after inserting a guard band 52 in the groove 33. The upper face of the upper lining ring 11 is secured by pressing the peripheral rib 39 of the body 7 which is slotted by means of the gap 38. The peripheral gap 38 is closed by the insertion and caulking of a steel or copper wire 47. The lining ring 10 guiding the uppermost piston ring above is anchored in the same manner as the lowest lining ring 13 in the rib 20 (serrated in cross section) of the lining ring 10, 13 on the piston body 7 by bending inwards the peripheral ribs 43 and 44 formed from the peripheral parts 36 and 37 after the dovetailed annular gap 23 (having an enlarged bottom and a narrow top 42 and forming the bottom of the corresponding piston ring grooves still open after the insertion of the lining rings 10, 13) has been filled by a metal band 48 which can be caulked. In the case of the piston ring 5, the said metal band 48 bears against the upper unlined guide wall of the peripheral rib 19.

The lining rings are inserted and anchored in the piston body in the following manner:

By turning, the piston body 7 is first shaped on a lathe as shown in Figure 1. After the insertion of the lining rings 11 and 12 divided into segments, the peripheral ribs 39 and 40 provided on the piston body 7 are pressed into the grooves 24, 25, 26 of the lining rings 11, 12, whereby also the sides of the peripheral ribs 29, 31 closely engage the peripheral ribs 30, 32 of the piston body 7. After filling the peripheral gaps 38, 41, 54 by inserting and caulking metal bands 47, 49, 51 preferably copper wires, the piston is shaped on a lathe as shown in Figure 2. In order to facilitate the insertion of the lining rings 10 and 13, the peripheral ribs 36 and 37 together with the piston annular groove 8 assume the cross-sectional shape as shown in Figure 2, so that the annular groove assumes the shape 9 and the peripheral ribs assume the shapes 43 and 44. After the insertion and caulking of the metal bands 48, the peripheral ribs 43 and 44 are pressed onto the lining rings 10 and 13.

Moreover, the metal bands 49, 51 may be secured by interlocking them with grooves 27, 34.

In order to facilitate the jogging of the metallic section bands 48, it may be advisable to insert a supporting steel band 53 (Fig. 2) which may be removed after the jogging operation.

The piston is then turned on a lathe and the piston ring grooves are accurately machined.

In the case of cast iron piston bodies, peripheral ribs 43, 44 and 39 which are compressible by being bent inwards cannot be used. In the case of cast iron piston bodies, the lining rings 14 (Fig. 4) which are provided on the back with curved surfaces 56, 57 inclined outwardly to the axis of the piston must therefore be pressed by caulked metal bands 48 into splayed counter grooves 45 which are dovetailed at 21.

When using the above described method of anchoring the lining rings of all piston ring grooves, it is possible to make the piston body of an elastic material such as soft bendable or malleable metal whereby piston breakages are substantially prevented. Lining rings consisting of a material which can still be worked increase the resistance of the piston ring grooves to wear and tear and thus materially increases the life of the piston.

I claim:

1. A piston including a body having lining ring receiving grooves, lining rings therefor, ribs of serrated shape in cross section on the rings for anchoring the rings in the grooves in the piston body in the axial direction thereof, the lining rings being provided on the back with surfaces which are inclined outwardly to the axis of the piston body and are directed downwardly in connection with the lower lining ring and upwardly in connection with the upper lining ring.

2. A piston according to claim 1, characterized by the feature that the lining rings are clamped by the inward bending of peripheral ribs provided on the piston body.

3. A piston according to claim 1, characterized by the feature that the ribs serrated in cross section of the lining rings are supported in the grooves of the piston body by bands jogged on the bottom of the piston ring groove.

4. A piston according to claim 1, characterized by the feature that the ribs of adjacent lining rings are anchored by forcing a metal band into slotted peripheral ribs of the piston body.

GUSTAVO GIBERTI.